United States Patent
Fedorov et al.

(10) Patent No.: US 11,741,467 B2
(45) Date of Patent: *Aug. 29, 2023

(54) EFFICIENT VALIDATION OF TRANSACTION POLICY COMPLIANCE IN A DISTRIBUTED LEDGER SYSTEM

(71) Applicant: NEC Corporation, Tokyo (JP)

(72) Inventors: Sergey Fedorov, Heidelberg (DE); Wenting Li, Heidelberg (DE); Ghassan Karame, Heidelberg (DE)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/548,644

(22) Filed: Dec. 13, 2021

(65) Prior Publication Data

US 2022/0101320 A1    Mar. 31, 2022

Related U.S. Application Data

(63) Continuation of application No. 15/916,293, filed on Mar. 9, 2018, now Pat. No. 11,238,449.

(Continued)

(51) Int. Cl.
*G06Q 20/40*  (2012.01)
*H04L 67/104*  (2022.01)
(Continued)

(52) U.S. Cl.
CPC .......... *G06Q 20/401* (2013.01); *G06F 21/51* (2013.01); *G06F 21/53* (2013.01); *H04L 9/0637* (2013.01);
(Continued)

(58) Field of Classification Search
None
See application file for complete search history.

(56) References Cited

U.S. PATENT DOCUMENTS 7,185,047 B1    2/2007  Bate
10,438,198 B1   10/2019 Griffin et al.
(Continued)

FOREIGN PATENT DOCUMENTS

WO    WO 2016128491 A1    8/2016

OTHER PUBLICATIONS

U.S. Appl. No. 15/916,293, filed Mar. 9, 2018, Pending.
(Continued)

*Primary Examiner* — Neha Patel
*Assistant Examiner* — Nicholas K Phan
(74) *Attorney, Agent, or Firm* — Leydig, Voit & Mayer, Ltd.

(57) ABSTRACT

Systems and methods for validation of transaction policy compliance are provided. Code is implemented, including a transaction policy compliance check, in a form of a trusted application to be executed in a trusted execution environment (TEE). A secret is attested and provisioned to a trusted application instance in the TEE. The trusted application instance is executed on a client transaction request to generate a policy compliance result. A transaction object is generated, including the policy compliance result and a proof of the execution. The transaction object is proposed to a distributed ledger system. The policy compliance result and a proof of the execution during transaction validation in the distributed ledger system is verified.

15 Claims, 6 Drawing Sheets

Related U.S. Application Data

(60) Provisional application No. 62/599,808, filed on Dec. 18, 2017.

(51) Int. Cl.
  *G06F 21/53* (2013.01)
  *H04L 9/32* (2006.01)
  *G06F 21/51* (2013.01)
  *H04L 9/40* (2022.01)
  *H04L 9/06* (2006.01)
  *H04L 9/00* (2022.01)

(52) U.S. Cl.
  CPC .......... *H04L 9/3239* (2013.01); *H04L 9/3247* (2013.01); *H04L 9/3263* (2013.01); *H04L 63/0823* (2013.01); *H04L 63/12* (2013.01); *H04L 67/104* (2013.01); *H04L 9/50* (2022.05)

(56) References Cited

U.S. PATENT DOCUMENTS

| 10,447,478 | B2* | 10/2019 | Gray | H04L 9/3239 |
| 10,484,346 | B2 | 11/2019 | Russinovich et al. | |
| 2008/0275591 | A1 | 11/2008 | Chirnomas | |
| 2014/0096182 | A1 | 4/2014 | Smith | |
| 2014/0279606 | A1* | 9/2014 | Storm | G06Q 30/018 705/317 |
| 2017/0230189 | A1 | 8/2017 | Toll et al. | |
| 2017/0251400 | A1* | 8/2017 | Jha | H04W 48/16 |
| 2017/0286717 | A1* | 10/2017 | Khi | G06F 21/6245 |
| 2017/0346807 | A1 | 11/2017 | Blasi | |
| 2017/0353309 | A1 | 12/2017 | Gray | |
| 2019/0122322 | A1 | 4/2019 | Perez | |
| 2019/0386834 | A1* | 12/2019 | Furukawa | H04L 9/3239 |

OTHER PUBLICATIONS

Wenting Li, et al., "Towards Scalable and Private Industrial Blockchains", BCC '17 Proceedings of the ACM Workshop on Blockchain, Cryptocurrencies and Contracts, Apr. 2, 2017, pp. 9-14, ACM, US.

Hyperledger Fabric, "hyperledger-fabricdocs Documentation: Release master," Nov. 1, 2017, pp. 1-217, The Linux Foundation, US.

C. Stathakopoulou, et al., "Threshold Signatures for Blockchain Systems", RZ 3910 Computer Science: Research Report, Apr. 4, 2017, pp. 1-42, IBM, US.

* cited by examiner

EFFICIENT VALIDATION OF TRANSACTION POLICY COMPLIANCE IN A DISTRIBUTED LEDGER SYSTEM

CROSS-REFERENCE TO RELATED APPLICATIONS

This patent application is a continuation of U.S. patent application Ser. No. 15/916,293, filed on Mar. 9, 2018, which claims the benefit of U.S. Provisional Patent Application No. 62/599,808, filed Dec. 18, 2017. The entire disclosures of the foregoing applications are hereby incorporated by reference herein.

FIELD

The present invention relates to a method and system for validating compliance of a transaction proposed to a distributed ledger system.

BACKGROUND

Distributed ledger technologies, such as Bitcoin or Ethereum, may be used in various industrial applications. Distributed ledger technology may increase the availability and robustness of certain applications. For example, financial settlement systems increasingly use distributed ledger technology to increase their reliability.

However, transaction validation in distributed ledger technology is replicated and distributed among multiple stakeholders. Many industrial use cases require a supervisor role, such as a regulator. The regulator may require transactions conform to certain policies imposed by the regulatory authority before being committed to a ledger. Some industries include a single regulator and a large number of distributed ledgers governed by the regulator policies. However, it is difficult to check and enforce the policies in a distributed ledger system. The scalability and assurance of policy compliance is difficult to achieve.

A regulator may be actively involved in the transaction validation process and explicitly confirm every transaction proposed to the distributed ledger system by performing the policy checks on computing platforms fully controlled by the regulator. A compliant transaction can be certified by a regulator using a digital signature scheme, such that it would be later verified by the nodes of the distributed ledger system. Only transactions properly certified by the regulator would continue with the consensus process. However, this approach has a scalability limitation. As the total number of transactions proposed in all governed distributed ledgers increases, the networking and computational burden on the regulator increases linearly. Additionally, the regulator is a single point of failure in the system.

SUMMARY

In an embodiment, the present invention provides a method for validation of transaction policy compliance. The method comprises: receiving, by a proposing node, a transaction policy compliance check trusted application from a regulator; executing, by the proposing node, the transaction policy compliance check trusted application, in a trusted execution environment (TEE); remotely attesting, by the proposing node, the trusted application instance in the TEE to the regulator; receiving, by the proposing node, and provisioning of a secret to a trusted application instance in the TEE from the regulator; executing, by the proposing node, the trusted application instance on a client transaction request to generate a policy compliance result; producing, by the proposing node, with the secret inside the trusted application instance, a digital signature over an input combined with a result of the trusted application execution; generating, by the proposing node, a transaction object including the policy compliance result and a proof of the execution; enforcing, by the regulator, policies in a distributed ledger system by means of the transaction policy compliance check trusted application, wherein the regulator does not directly participate in a consensus protocol of the distributed ledger system; and proposing, by the proposing node, the transaction object to the distributed ledger system.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

A problem unique to computer networks and solved by embodiments of the present invention is to provide a computationally efficient system for transaction policy compliance of a transaction in a distributed ledger system. According to some embodiments, the described mechanism provides a secure and efficient way to validate compliance of a transaction proposed to a distributed ledger system according to the policy rules imposed by a regulating authority. Active use of regulator's computing resources and duplicated execution of policy check logic on multiple nodes of the distributed ledger network is minimized. This provides a highly scalable system. A trusted execution environment provided by some processors is leveraged to provide security. In contrast to traditional systems, embodiments of the invention provide an efficient, scalable system for enforcing transaction policy compliance of a transaction in a distributed ledger system.

A distributed ledger (DL) system is a peer-to-peer network of interconnected nodes maintaining a replicated ledger of an ordered sequence of transaction records. A specific consensus protocol is executed by the nodes to ensure consistency, reliability and integrity of the ledger as new transactions are appended to it. As part of the consensus protocol, there is a validity check that new transactions must pass to be included in the ledger. The validity check improves the consistency of the DL. In one embodiment, the validity check is a replicated state machine maintained collectively by multiple nodes in the DL system.

Figure 1:
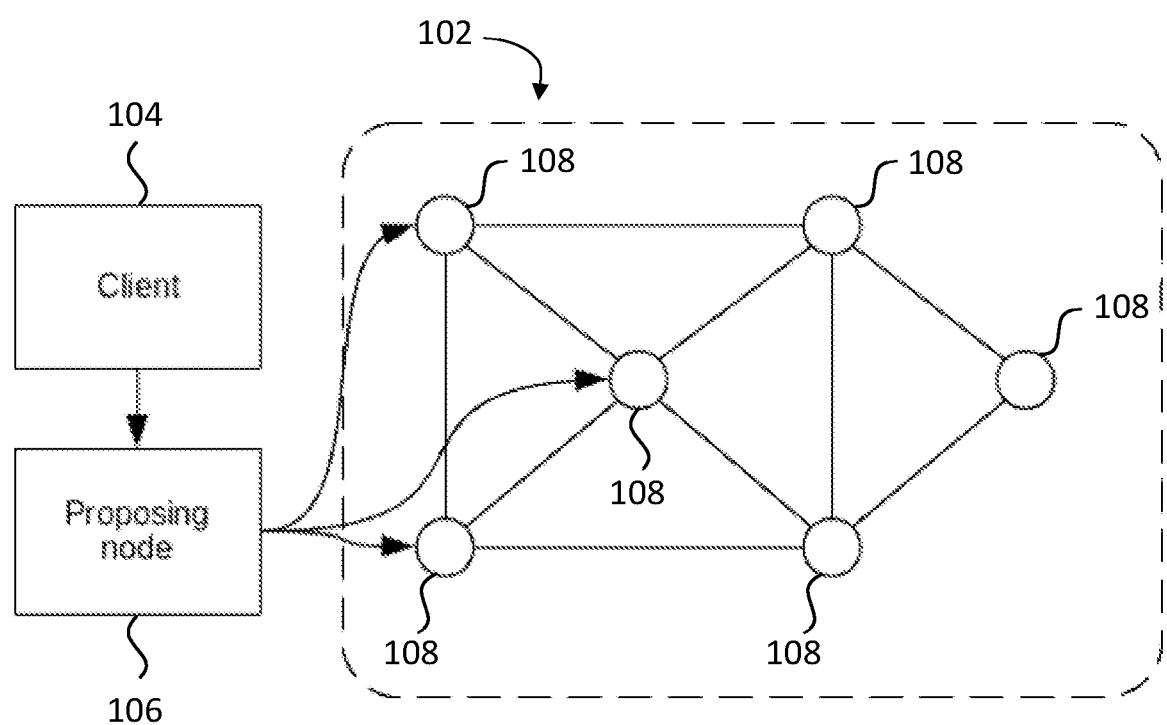
FIG. 1 illustrates a distributed ledger network according to an embodiment.

FIG. 1 illustrates a distributed ledger network 102 according to an embodiment. A client 104 requests a particular change or transaction be recorded in the DL 102. A proposing node 106 prepares a transaction object corresponding to the request of the client 104 be appended to the DL 102 and proposes it to other nodes 108 in the system. The transaction object may include a sequence number assigned by the proposing node. A validating node 108 performs a validity check of the proposed transaction according to the consensus protocol used in the DL system 102. In some embodiments, a validating node is able to validate a transaction and DL nodes are light clients.

In some embodiments, a regulator represents a regulatory authority that can enforce policies in the DL system without necessarily actively participating in the consensus protocol. The regulator can issue the policies in the form of executable code, a policy check module, that processes a transaction request as an input data and produces a transaction policy check status as an output data. The policy check modules can be signed by the regulator for later verification by the other stakeholders or nodes.

In some embodiments, a trusted execution environment (TEE) is an isolated environment with strictly defined entry and exit mechanisms, provided by a processor. The processor protects code and data loaded inside the TEE with respect to confidentiality and integrity. The isolated instance of code running inside a TEE and its protected data is a trusted application.

Remote attestation allows a claim to be made about the properties of a target by supplying evidence to an appraiser over a network. In some embodiments, the TEE supports a form of remote attestation such that a remote party can use it to identify an instance of a specific trusted application running on an authentic hardware platform. Additionally, a secure communication channel can be established to the trusted application bound to the result of remote attestation.

According to some embodiments, the policy check module issued by the regulator can be executed with the standard validity check performed by the DL system as defined by its consensus protocol. Embodiments of the invention work with a variety of consensus protocols and can be used with, for example, Hyperledger Fabric and Corda. In these embodiments, the policy compliance is assured at the same level of reliability as the transaction validity that is guaranteed by a particular consensus protocol used in the DL system. Only transactions that pass both the validity check and regulator policy check can be included in the DL. This requires the regulatory policy check logic be executed on every validating node which imposes additional computation overhead on those nodes.

In some embodiments, the TEE provided by some processors is utilized. Provable delegated code execution in a TEE is used to construct an efficient validation of transaction policy compliance in DL system. An authority implements logic in a form of program code, (authority code). The authority code may be executed on a computing platform which is not fully controlled by the authority. An executor operates an execution platform which provides a TEE. The executor can provably execute the authority code. A verifier may verify the result of correct execution of authority code on the execution platform, given a specific input.

In some embodiments, the executor executes the authority code given a specific input. The executor may prove to the verifier that the code was correctly executed and produced a particular output. An authority creates a trusted application to be executed in TEE of the execution platform. The trusted application may provide remote attestation. The trusted application may also provide provisioning of a secret using a secure channel established as part of the remote attestation in a way that the secret remains confidential to the trusted application. Additionally, execution of the authority code given a specific input produces the result of execution and a signature over the input and the result using a previously provisioned secret. Thus, a proof of execution can be provided.

Figure 2:
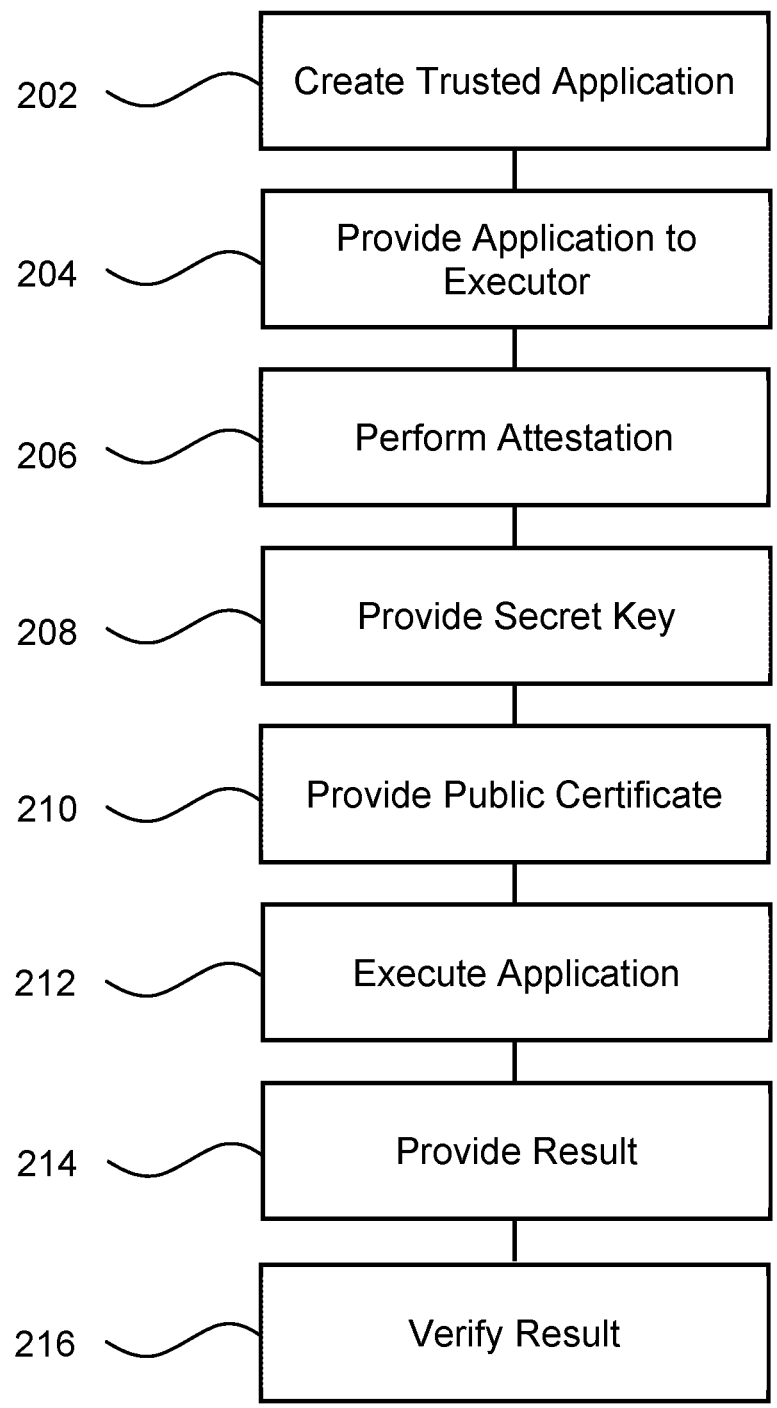
FIG. 2 illustrates a process executing code and providing proof of the output according to an embodiment.

FIG. 2 illustrates a process for an executor to execute the authority code given a specific input and prove to the verifier that the code has been correctly executed and has produced a particular output. At step 202 the authority creates a trusted application to be executed in the TEE of the execution platform. For example, the authority may implement code, including a transaction policy compliance check, in a form of a trusted application to be executed in a trusted execution environment (TEE). In some embodiments, the trusted application provides remote attestation as described above. Further, the trusted application may provide provisioning of a secret using the secure channel established as part of the remote attestation such that the secret remains confidential to the trusted application. Additionally, the trusted application may provide execution of the authority code given a specific input producing the result of execution and a signature over the input combined with the result using a previously provisioned secret, proof of execution.

At step 204, the trusted application is delivered to executor and instantiated in TEE of the execution platform. At step 206, the authority performs remote attestation of the trusted application instance and the execution platform. In the case of successful attestation, a secure channel between the authority and the trusted application instance is established.

At step 208, the secure channel is utilized to perform provisioning of a secret to the trusted application instance. Additionally, a corresponding public certificate is derived. The public certificate can be used to verify a digital signature produced using the secret as a private key of a specific signature scheme.

At step 210, the authority makes the public certificate eventually available to the verifier. At step 212, the trusted application instance is used to execute the authority code given a specific input and produce the result together with the proof of execution. A transaction object, which may include the policy compliance result and a proof of the execution, is generated.

At step 214, the input, result and proof of execution are provided to the verifier. Additionally, at step 216, the verifier uses the available public certificate and verifies the validity of proof of execution given the input and the result.

In one embodiment, the authority code is implemented using the Intel® 64 instruction set. The Intel® Software Guard Extensions (SGX) enabled platform is used as an execution platform. The Intel® Attestation Service for SGX (IAS) and standard remote attestation protocol of the Intel® SGX SDK are used for remote attestation and establishing a secure channel. The RSA digital signature algorithm and X.509 public key certificate format may be used for generation and verification of proof of execution. The authority possesses a valid verifiable X.509 CA certificate and the corresponding private key, $Authority_{CACert}$ and $Authority_{CAKey}$ correspondingly. $Authority_{CACert}$ is available to Executor and Verifier. In some embodiments, the authority is registered within IAS as a service provider. The authority possesses a valid X.509 certificate and the corresponding private key suitable to generate an SGX enclave signature, $Authority_{EnclaveCert}$ and $Authority_{EnclaveKey}$ respectively. $Authority_{EnclaveCert}$ is signed with $Authority_{CAKey}$.

Figure 3:
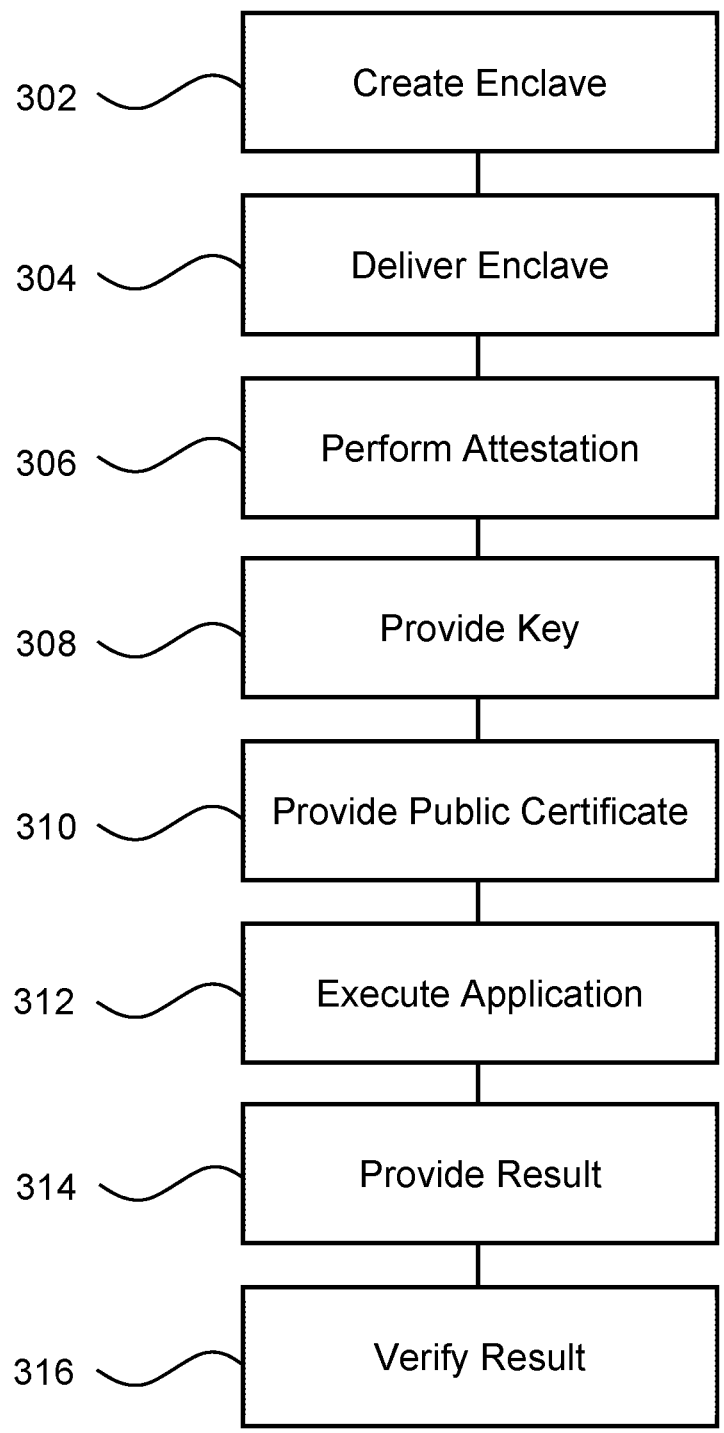
FIG. 3 illustrates a process executing code and providing proof of the output according to another embodiment.

FIG. 3 illustrates a process for an executor to execute the authority code given a specific input and prove to the verifier that the code has been correctly executed and has produced a particular output according to an embodiment.

At step 302, the authority creates an SGX enclave and produces a signed enclave file structure using $Authority_{EnclaveKey}$. The enclave provides the following entry points:

initRa( ) initializes remote attestation process and returns the key exchange context, KEContext using standard remote attestation scheme of the SGX SDK;

provision(KEContext) generates a pair of RSA keys, Secret and Public—secret and public keys, respectively; securely stores (seals) Secret; generates an X.509 certificate signing request, CSR, from Public; produces a message authentication code over CSR using the shared secret key, Shared, derived during the key exchange of remote attestation: $MAC_{CSR}$= AES__CMAC(Shared, CSR) and returns {CSR, $MAC_{CSR}$}; and execute(Input) executes the authority code passing Input as an input, receives the result of the execution Result, produces a proof of authority code execution in a form of digital signature using the provisioned secret: Signature=Sign(Secret, Input||Result) and returns {Result, Signature}.

At step 304, the signed enclave file is delivered to the executor. The executor creates an instance of the SGX enclave using the signed enclave file. The Intel® SGX platform checks the enclave signature and instantiates the enclave only if the signature is valid.

At step 306, the authority in coordination with the executor performs remote attestation of the execution platform and the enclave instance utilizing the enclave's initRa( ) entry point using the standard remote attestation scheme of the Intel® SGX SDK. In the case of successful attestation, a shared secret key, Shared, is derived during the key exchange procedure that is bound to the attestation results. On the executor side, Shared can only be retrieved by the enclave instance from KEContext. In case of attestation failure, the protocol terminates with failure.

At step 308, the key is provided. The executor uses enclave's provision(KEContext) entry point to get {CSR, $MAC_{CSR}$}. The executor delivers {CSR, $MAC_{CSR}$} to the authority.

At step 310, the public certificate is provided. The authority verifies that $MAC_{CSR}$ is valid and corresponds to the CSR using Verify_AES_CMAC(Shared, CSR, $MAC_{CSR}$). If the verification is successful then the authority generates an X.509 certificate, Cert, for the CSR signed with $Authority_{EnclaveKey}$, otherwise the protocol terminates with failure. The data {Cert, $Authority_{EnclaveCert}$} is transmitted to the executor, and the executor stores it in an unprotected storage.

At step 312, the executor produces {Result, Signature} using the enclave's execute(Input) entry point. At step 314, {Input, Result, Signature, Cert, $Authority_{EnclaveCert}$} is transmitted to the verifier. At step 316, the verifier uses $Authority_{CACert}$, $Authority_{EnclaveCert}$ and Cert, to verify the Signature: Verify(Input||Result, Signature, {$Authority_{CACert}$, $Authority_{EnclaveCert}$, Cert}). If the verification is successful then Result is deemed to be a proved result derived from execution of authority code, given Input as an input. If the verification is not successful, the protocol terminates with a failure.

Figure 4:
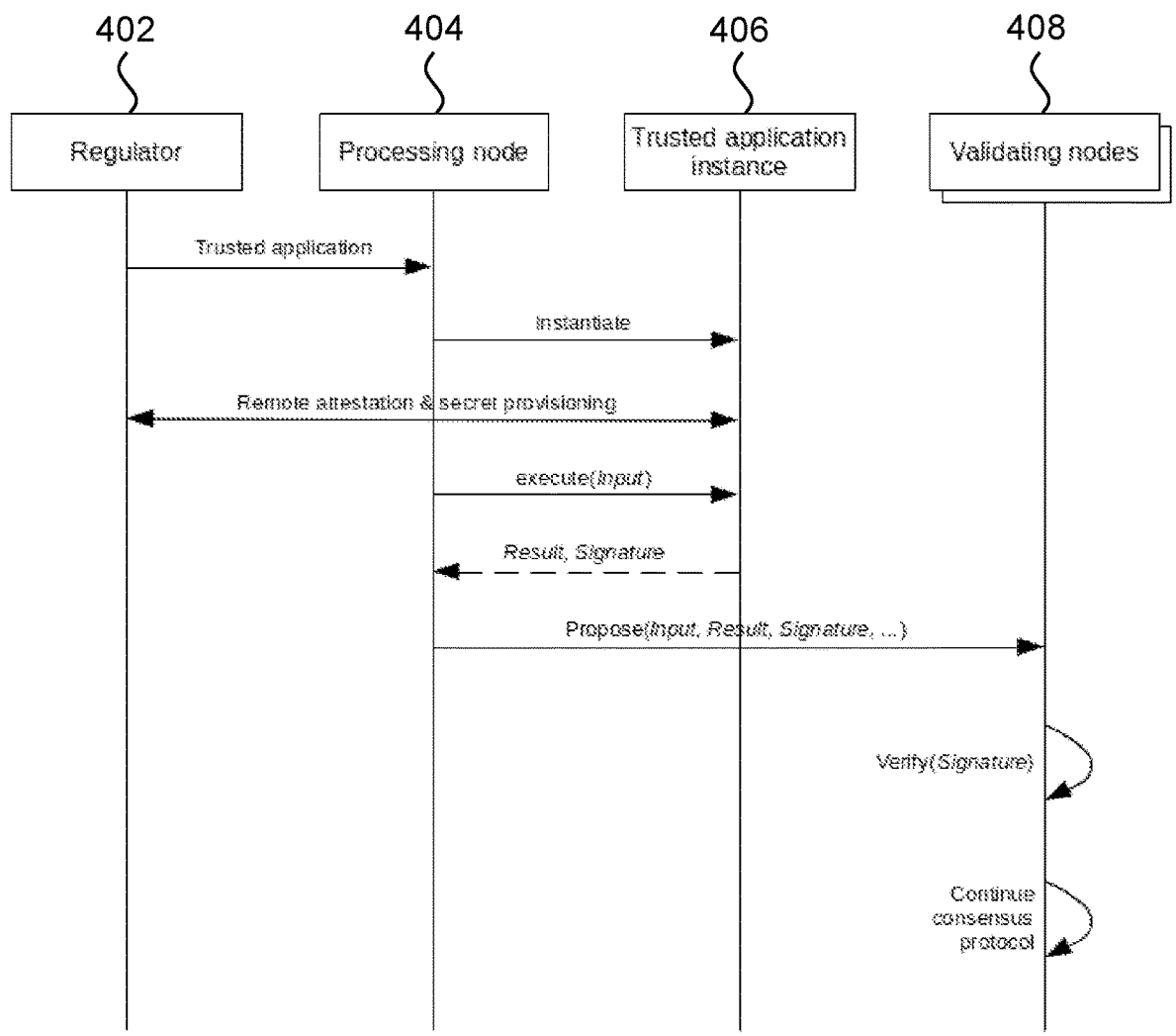
FIG. 4 illustrates an implementation of a transaction policy in a distributed ledger system according to an embodiment.

FIG. 4 illustrates an implementation of a transaction policy using TEE in a DL system according to an embodiment. In this embodiment, the regulator is the authority. The proposing node is the executor. The verifying node is the verifier.

The regulator 402 creates a trusted application, using the policy check module as authority code. The trusted application is delivered to the proposing node (processing node) 404 and instantiated in the TEE of the execution platform 406. The regulator 402 then performs remote attestation of and provisions a secret to the trusted application 406. The regulator 402 then makes the corresponding public certificate available to the verifying node or nodes 408.

The trusted application instance 406 is used to execute the policy check using a request of a client node as an input and producing the policy check status as a result together with the proof of the policy check execution.

If the policy check status shows failure, then the protocol terminates with a failure. Otherwise, the policy check status and the proof of execution are included in a new transaction object which is then proposed to other nodes of the DL system, according to the consensus protocol.

The validating nodes 408, as part of performing their validity checks required by the consensus protocol, validate the proof of policy check execution. They also check the result of the policy check. In case of proof validation or policy check failure, the consensus protocol terminates with a failure. Otherwise, the consensus protocol is executed normally.

According to the protocol described in this embodiment, transactions proposed in the system pass the regulator policy check to be included in the DL according to the consensus protocol used in the DL system.

In an embodiment, the DL system is implemented as a Hyperledger Fabric v1 blockchain system (Fabric). In this embodiment, the consensus protocol in the fabric can be viewed as a combination of endorsement, ordering, validation and commitment processes in the Hyperledger Fabric v1 blockchain system.

In some embodiments, the fabric client node is the client node and the proposing node. The fabric endorsing peer is the validation node. The validity check is performed in the execution of the fabric chaincode (smart contract) on the endorsing peers.

The corresponding chaincode in the transaction handling, validation chaincode, interfaces with a special chaincode, policy check chaincode, to validate the proof of delegated policy check execution. The validation chaincode terminates transaction processing with a failure in the case of failed invocation of the policy check chaincode. The policy check chaincode is instantiated with the regulator X.509 CA certificate, $Authority_{CACert}$.

Figure 5:
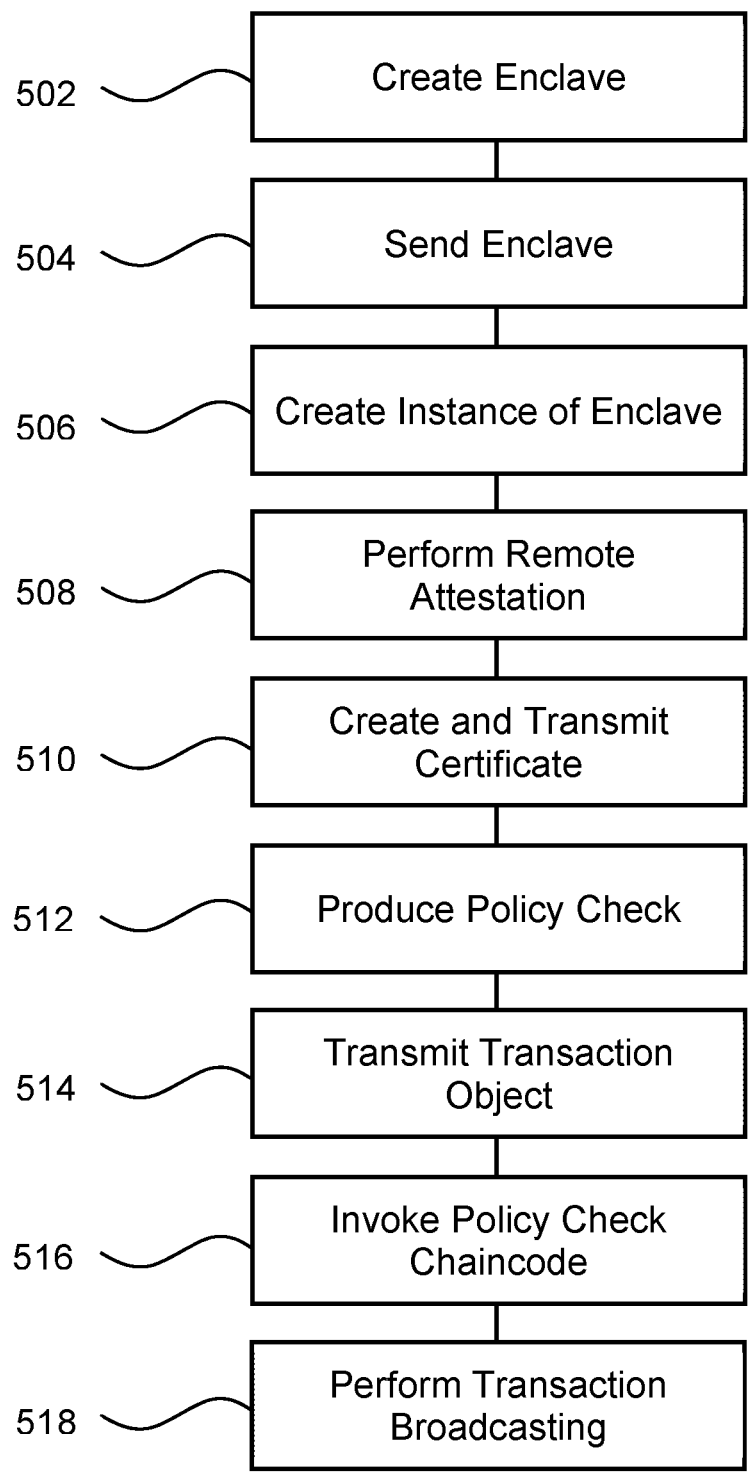
FIG. 5 illustrates a protocol for validating compliance of a transaction proposed to a distributed ledger system according to an embodiment.

FIG. 5 illustrates a protocol for validating compliance of a transaction proposed to a distributed ledger system according to an embodiment. At step 502, the regulator creates an SGX enclave, using the policy check module as authority code. This may include implementing code, including a transaction policy check in the form of a trusted application. At step 504, signed enclave file is sent to the fabric client node. At step 506, the fabric client node creates an instance of the SGX enclave using the signed enclave file.

At step 508, the regulator performs remote attestation of and provisions an RSS private key to the SGX enclave. At step 510, the regulator issues and transmits the corresponding X.509 certificate to the fabric client node to be stored.

At step 512, using enclave's execute(Input) entry point and end-user's request data as Input, the fabric Client node produces the policy compliance result together with the proof of policy check execution, {Result, Signature}. If the policy check status shows failure then the protocol terminates with a failure. At step 514, the data {Input, Result, Signature, Cert, Authority$_{EnclaveCert}$} is included in a new transaction object. The transaction object is transmitted to a set of fabric endorsing peers for normal endorsement process.

At step 516, the fabric endorsing peers invoke the policy check chaincode as part of normal validation chaincode invocation supplied with the transaction object. The validation chaincode validates the proof of policy check execution. In the case of proof validation or policy check failure, the policy check chaincode invocation is terminated with failure, ensuring that the validation chaincode terminates with failure as well and the endorsement fails. Otherwise, the endorsement process finishes normally, and at step 518, the fabric client node proceeds with transaction broadcasting through the fabric ordering service of the Hyperledger Fabric system.

Figure 6:
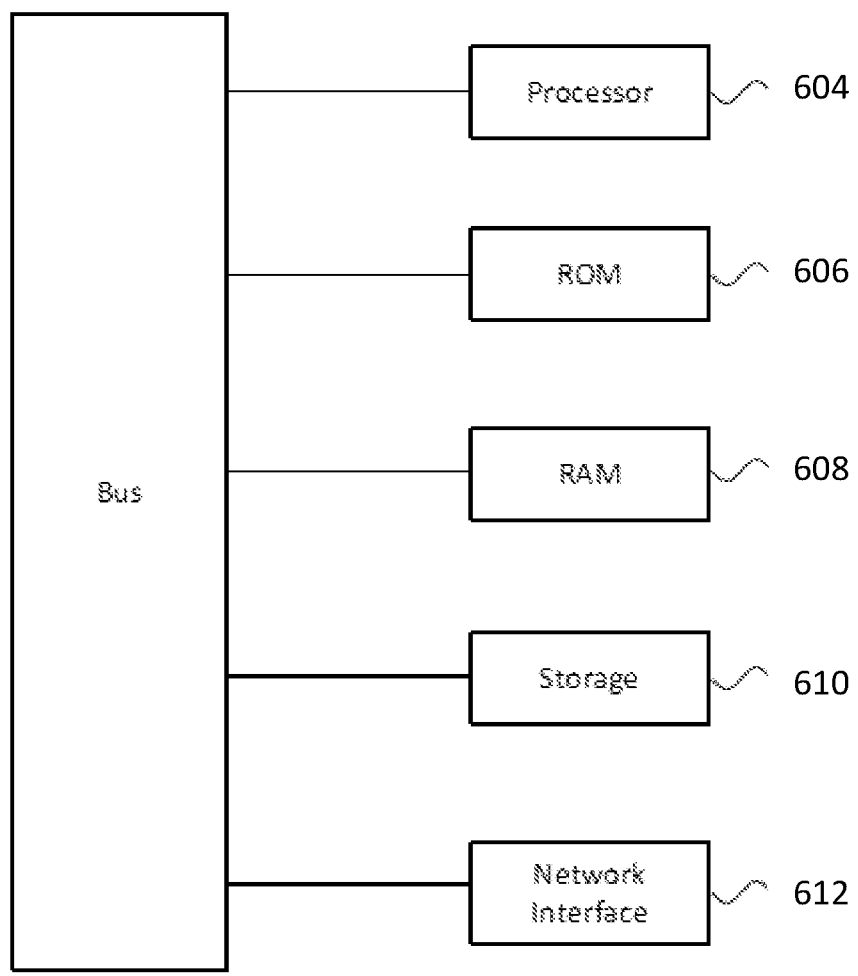
FIG. 6 illustrates a block diagram of a processing system according to one embodiment.

FIG. 6 is a block diagram of a processing system according to one embodiment. The processing can be used to implement the protocols, systems and nodes described above. The processing system includes a processor 604, such as a central processing unit (CPU) of a computing device, and executes computer executable instructions comprising embodiments of the system for performing the functions and methods described above. In embodiments, the computer executable instructions are locally stored and accessed from a non-transitory computer readable medium, such as storage 610, which may be a hard drive or flash drive. Read Only Memory (ROM) 606 includes computer executable instructions for initializing the processor 604, while the random-access memory (RAM) 608 is the main memory for loading and processing instructions executed by the processor 604. The network interface 612 may connect to a wired network or wireless network and to a local area network or wide area network, such as the internet.

All references, including publications, patent applications, and patents, cited herein are hereby incorporated by reference to the same extent as if each reference were individually and specifically indicated to be incorporated by reference and were set forth in its entirety herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for validation of transaction policy compliance comprising:
   receiving, by a proposing node, a transaction policy compliance check trusted application from a regulator;
   executing, by the proposing node, the transaction policy compliance check trusted application, in a trusted execution environment (TEE);
   remotely attesting, by the proposing node, the trusted application instance in the TEE from the regulator;
   executing, by the proposing node, the trusted application instance on a client transaction request to generate a policy compliance result;
   producing, by the proposing node, with the secret inside the trusted application instance, a digital signature over an input combined with a result of the trusted application execution;
   generating, by the proposing node, a transaction object including the policy compliance result and a proof of the execution;
   enforcing, by the regulator, policies in a distributed ledger system, wherein the regulator does not directly participate in a consensus protocol of the distributed ledger system; and
   proposing, by the proposing node, the transaction object to the distributed ledger system.

2. The method according to claim 1, further comprising:
   verifying, with a public certificate corresponding to the provisioned secret, the digital signature produced by the trusted application instance as a proof of the trusted application execution.

3. The method according to claim 1, further comprising verifying, by a plurality of validating nodes, the policy compliance result and a proof of the execution during transaction validation in the distributed ledger system.

4. The method of claim 1, wherein producing, with the secret inside the trusted application instance, a digital signature over an input combined with a result of the trusted application execution is performed by an executor.

5. The method of claim 1, wherein the distributed ledger system is a blockchain network.

6. The method of claim 1, wherein the distributed ledger system is a Ethereum platform.

7. The method of claim 1, wherein the distributed ledger system uses Hyperledger Fabric.

8. The method of claim 1, wherein the TEE uses the software guard extensions platform.

9. The method of claim 1, wherein the TEE is in a proposing node.

10. A proposing node comprising one or more processors which, alone or in combination, are configured to provide for performance of the following steps:
    receiving, by a proposing node, a transaction policy compliance check trusted application from a regulator;
    executing, by the proposing node, the transaction policy compliance check trusted application, in a trusted execution environment (TEE);

remotely attesting by the proposing node, the trusted application instance in the TEE from the regulator;

executing, by the proposing node, the trusted application instance on a client transaction request to generate a policy compliance result;

producing, by the proposing node, with the secret inside the trusted application instance, a digital signature over an input combined with a result of the trusted application execution;

generating, by the proposing node, a transaction object including the policy compliance result and a proof of the execution;

enforcing, by the regulator, policies in a distributed ledger system, wherein the regulator does not directly participate in a consensus protocol of the distributed ledger system; and proposing, by the proposing node, the transaction object to the distributed ledger system.

11. The system according to claim 10, further comprising a step for:

verifying, with a public certificate corresponding to the provisioned secret, the digital signature produced by the trusted application instance as a proof of the trusted application execution.

12. The system according to claim 10, further comprising verifying, by a plurality of validating nodes, the policy compliance result and a proof of the execution during transaction validation in the distributed ledger system.

13. The system according to claim 10, wherein producing, with the secret inside the trusted application instance, a digital signature over an input combined with a result of the trusted application execution is performed by an executor.

14. The system according to claim 10, wherein the distributed ledger system is a blockchain network.

15. The system according to claim 10, wherein the TEE is in a proposing node.

\* \* \* \* \*